United States Patent [19]
Reynolds

[11] 4,383,787
[45] May 17, 1983

[54] FREE SPINNING LAMINATED NUT WITH AUTOMATIC LOCK

[76] Inventor: Richard L. Reynolds, 6 Stratford La., Ho Ho Kus, N.J. 07423

[21] Appl. No.: 187,833

[22] Filed: Sep. 16, 1980

[51] Int. Cl.³ ............................................ F16B 39/22
[52] U.S. Cl. .................................. 411/221; 411/330; 411/432; 29/446; 81/3 R; 301/115
[58] Field of Search ............... 411/221, 203, 202, 208, 411/211, 210, 260, 285, 276, 314, 313, 333, 330, 432, 910; 29/446, 452; 10/86 A

[56] References Cited

U.S. PATENT DOCUMENTS

| | | | |
|---|---|---|---|
| 712,905 | 11/1902 | Cannon | 411/221 |
| 1,293,755 | 2/1919 | Gorden | 411/330 |
| 1,755,807 | 4/1930 | Boles | 411/221 |
| 1,813,640 | 7/1931 | Rossetti | 411/330 |
| 2,581,641 | 1/1952 | Forgaard | 411/259 |
| 3,233,262 | 2/1966 | Vollman | 411/285 X |

FOREIGN PATENT DOCUMENTS

| | | | |
|---|---|---|---|
| 2829385 | 2/1979 | Fed. Rep. of Germany | 411/285 |
| 1193751 | 6/1970 | United Kingdom | 411/313 |

*Primary Examiner*—Ramon S. Britts
*Attorney, Agent, or Firm*—H. Hume Mathews

[57] ABSTRACT

A laminated nut composed of laminations of tapped conical spring washer segments in which at least one of the segments has a different load-deflection ratio than another segment, thereby to provide for more uniform loading of the threads on the laminated segments, and to provide for self locking of the nut on the bolt by thread interference. A lock mechanism is also provided that automatically and positively locks the nut to the associated bolt, as is required for safety purposes and to avoid legal charges of product liability.

9 Claims, 12 Drawing Figures

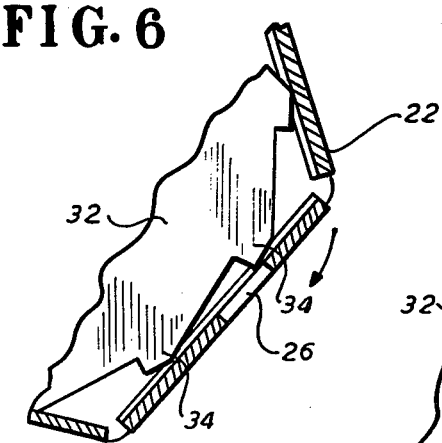
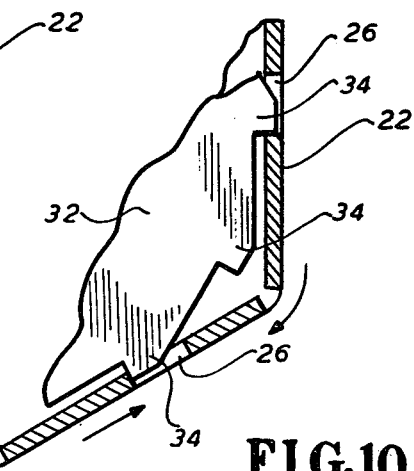
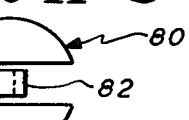
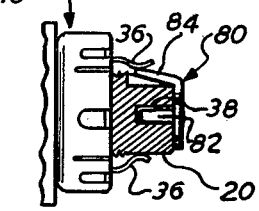
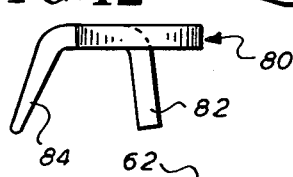
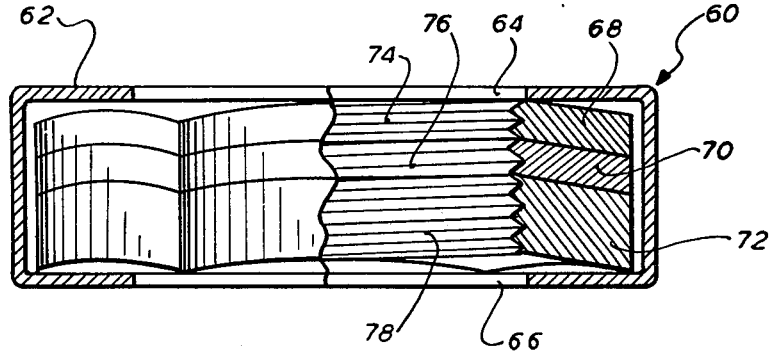

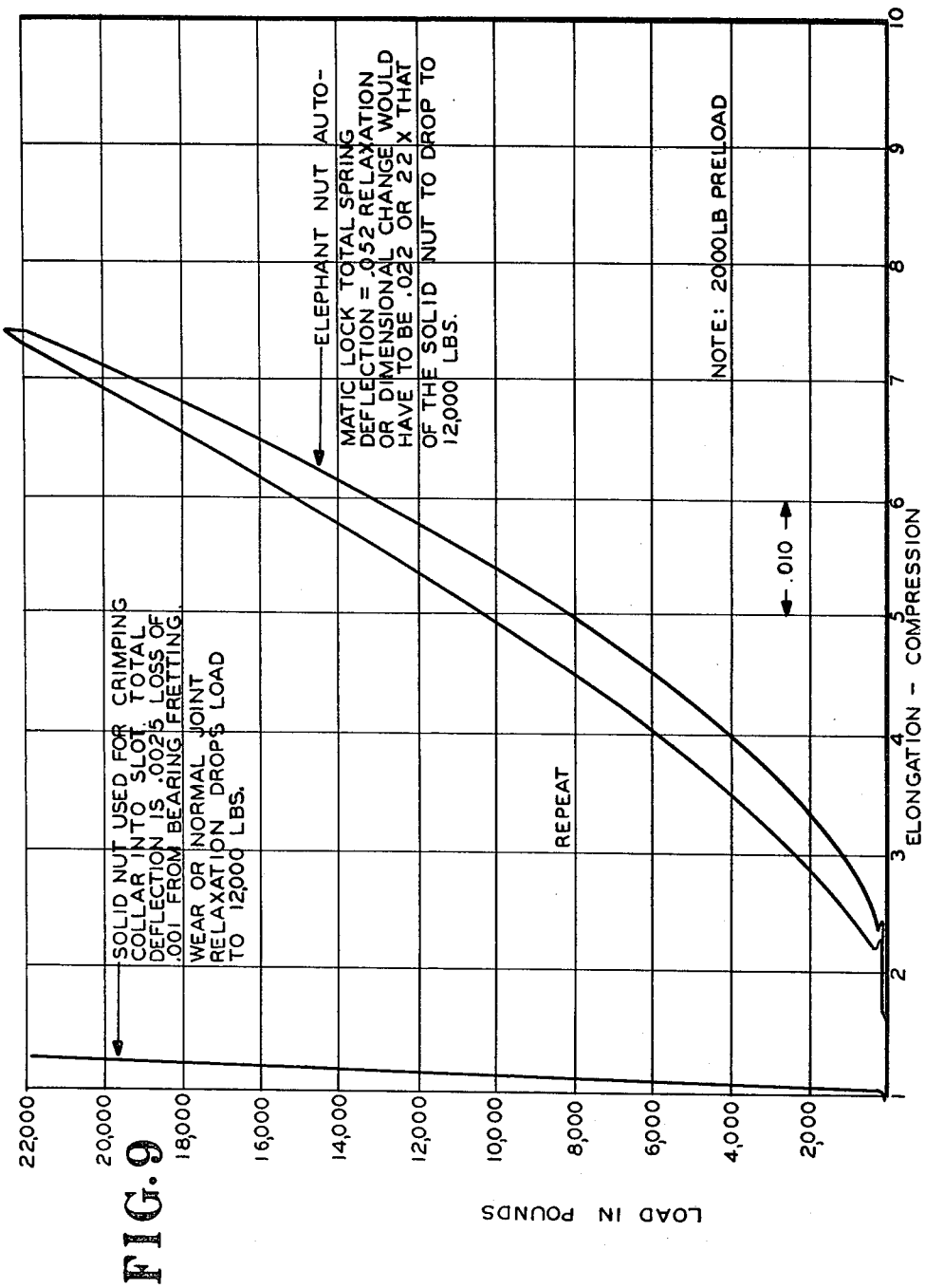

FREE SPINNING LAMINATED NUT WITH AUTOMATIC LOCK

BACKGROUND OF THE INVENTION

Free spinning laminated nuts utilizing laminations of hex shaped hardened coned-disc springs, formed as a helex or tapped to match the bolt threads are known in the prior art. Such nuts (sold by Peterson-American Corporation under the trademark "Elephant" nuts) have stacked aligned multiple threaded discs retained by a steel outer hex shaped cage. Wrenching dimensions may conform to standard SAE-IFI sizes.

These nuts are free running until seated. Locking load is applied by additional rotation after seating, which compresses and partially flattens the conical spring discs with resulting mechanical interference on the thread flanks due to the change in hole size as the conical disc flattens. This results in thread interference that resists unloading that might otherwise occur as a result of vibration. Thus, the independently loaded conical spring threaded segments when flattened create a thread interference that tends to lock the nut against rotation, or loosening, when subjected to vibration.

As compared to other free spinning locknuts, these nuts effect a dimensional change under loading. They have a conical spring action that enables them to be counter rotated over half a turn or so without loss of total load or loss of interference.

However, the prior art laminated nut, described above, requires for positive locking a secondary operation of adjustment to align holes for cotter key insertion, wiring, or requires mechanical nut deformation into a slot or recess. Further, in the prior art, the loading on the threads of the nut segments in non-uniform, to the extent such that the stress is concentrated in the first thread adjacent the bearing surface. At that point the stress may be as much as 200% or more higher than the average stress in the remaining threads.

SUMMARY OF THE INVENTION

According the present invention, the above referred to disadvantages of the prior art Elephant nuts are eliminated, and a new combination of elements is provided which forms a caged laminated nut that automatically and positively self-locks when tightened to a selected pre-loading, without adjustment. The nut is free running until seated, and the automatic lock mechanism ratchets freely with respect to the cage while the nut is being run down to its seated position. Reverse rotation of the cage is prevented, however, A ratcheting element in the automatic lock mechanism allows the nut to be tightened by free rotation in the "on" direction, but the ratchet prevents rotation in the "off" direction. At whatever value of pre-load desired, the nut is tightened to the extent necessary to provide that pre-load and the automatic lock mechanism will lock it positively in that position without "backing or filling" necessary to cotter key locking.

To back off or remove the nut, a tool is required to unlock the locking elements of the automatic lock, and only then can the nut be rotated in the loosening direction.

The invention also includes a new laminated nut having stacked conical spring washer segments in which the segments are so formed as to provide a more uniform thread loading, over the entire length of the threaded portion of the segments, as compared to the prior art laminated nut referred to above. According to the invention the load/deflection ratio of at least one of the conical spring washer segments is made greater for another spring segment. Preferably the segment next to the load surface is made with the larger load/deflection ratio, for example by making that segment of greater thickness than the other spring washer segment. When the segment nearest to the load is thus made of increased load/deflection ratio then another of the spring washers of lesser thickness, then the washer of greater load/deflection ratio will deflect at a smaller rate than the other conical spring washer and when the nut is fully tightened will take up or absorb a greater portion of the total stress than otherwise would be the case. This causes the load to be more evenly distributed among the threads of the various laminated spring washer segments and tends to eliminate or reduce failure by successive (i.e., one after another) thread stripping or by shearing of the bolt.

BRIEF DESCRIPTION OF THE DRAWINGS

FIGS. 6 and 7 are partial views showing the operation of the ratchet lock mechanism.

FIG. 8 is a view, similar to FIG. 3, of a modification of the caged laminated nut of this invention, incorporating means for loading the threads of the conical spring segments more uniformly than was the case in prior art laminated nut.

In FIGS. 3 and 8 it will be noticed that, for convenience, the outer edges of the washers are shown to be cylindrical. In actuality each of these surfaces would be slightly conical.

FIG. 9 is a graph comparing the effect of relaxation or dimensional changes on a solid nut with the effect of such changes on an Elephant nut. The nut size illustrated is M20 X 1.5.

FIG. 10 is a side view, partly in section, of a tool being used to disengage the nut lock to permit removal of the nut from the threaded end of the spindle.

FIG. 11 is a plan view of the tool of FIG. 10.

FIG. 12 is a side view of the tool of FIG. 10.

DETAILED DESCRIPTION

Figure 1:
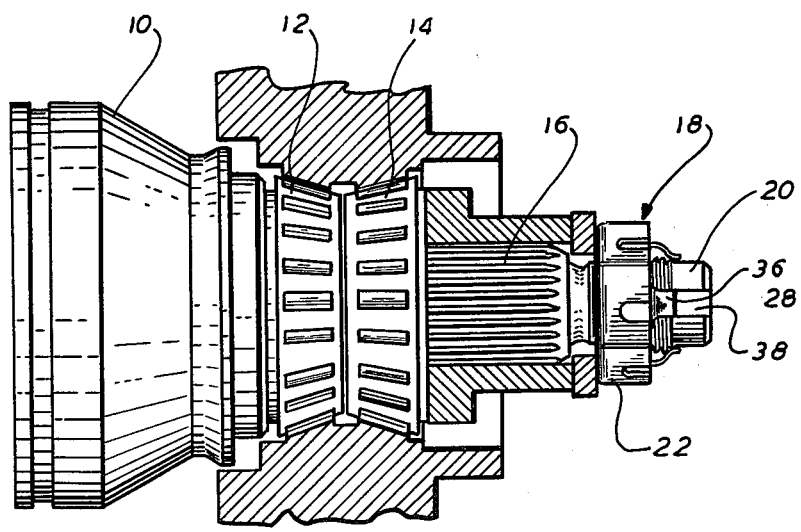
FIG. 1 of the drawings is a side view, partly in section, of a spindle for a front drive automobile in which the tapered roller bearings are pre-loaded to a selected value by an automatic locking caged laminated nut constructed in accordance with the present invention.
Figure 2:
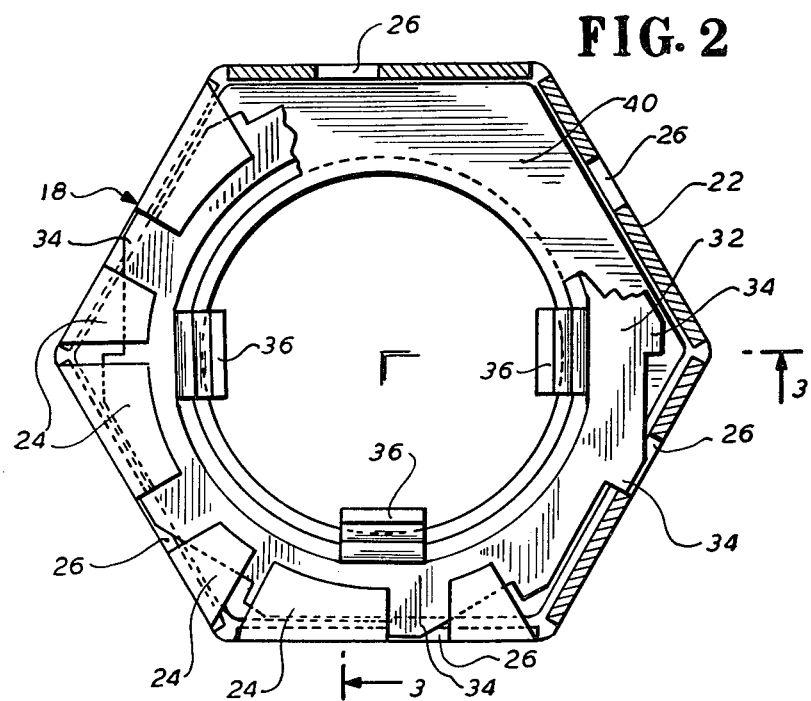
FIG. 2 is a plan view of the automatic locking nut of FIG. 1.

A particularly important application of the present invention is for spindles for front wheel drive automobiles. FIG. 1 shows such a spindle 10, including tapered roller bearings 12,14 which must, for proper operation, be pre-loaded to a selected value and then maintained pre-loaded at that value for long periods of operation, including operation while subject to vibration and shock.

A spindle nut for pre-loading said bearings and maintaining the pre-load during operations of the automobile, constructed according to the present invention, is shown at 18.

After assembly of the spindle components, nut 18 is run down freely, either by hand or by tool, on the threaded end portion of the spindle bolt 20 until it seats against a washer which transmits the force to a collar or wheel hub splined to the spindle at 16. The collar in turn transmits the pre-loading force to the tapered roller bearings 12,14. Such force may be, for example, of the order of magnitude of 5000 psi.

After the spindle nut seats, it is tightened by a wrench until the force it applies to the bearings is increased to the selected pre-loading value. The spindle bolt is placed in tension, and the tapered roller bearings are pre-loaded in compression. Tightening of nut 18 creates this tension and compression, to a degree determined by the nut tightening torque. The total clamp load generated by the nut is in the magnitude of 17,000 to 22,000 pounds.

Figure 3:
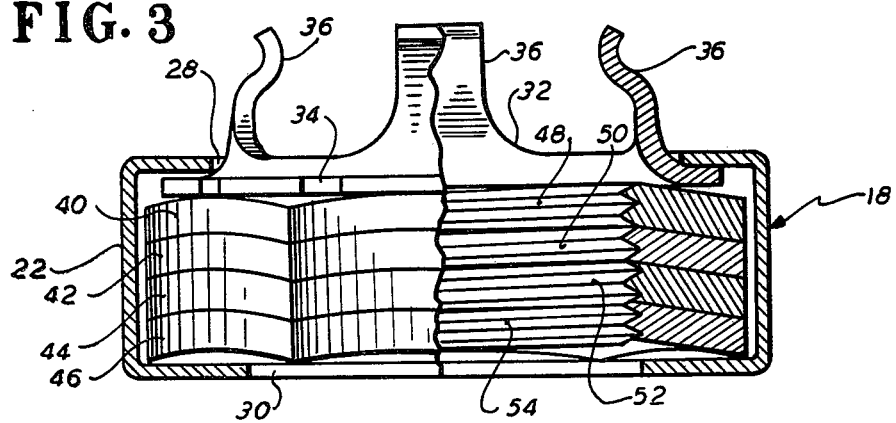
FIG. 3 is a sectional view along the lines 3—3 of the nut in FIG. 2.
Figure 4:
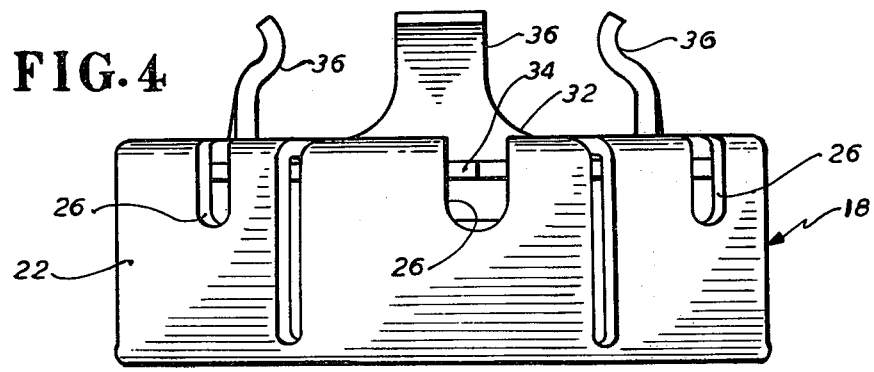
FIG. 4 is a side view of the nut of FIG. 2.
Figure 5:
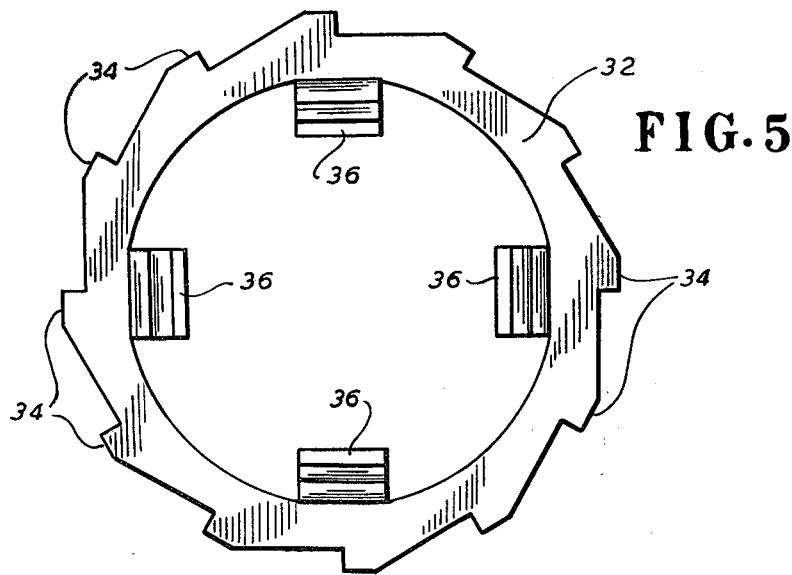
FIG. 5 is a plan view of the ratchet plate of the automatic nut locking mechanism.

The "turndown" of nut 18 will seat the bottom face of the nut flatly against the flat top of the washer on which it bears. It also, after it seats, will partially flatten the conical spring washer segments 40,42,44,46 (FIG. 3) and thereby create a spring force which gradually increases as the segments become more and more flattened, i.e. as they approach their planar position. The design is such that when the nut is fully tightened the conical spring segments are still not completely flat, but still have some bow. A typical bolt load design will flatten the conical spring washers by 60/70%. They are not entirely flattened.

As the nut 20 is tightened, ratchet lock 32, as shown in FIGS. 2,3,4,5,6, and 7, will ratchet, with the lugs 34 being freed from the locking slots 26 in cage 22 as the cage is rotated clockwise. The ratchet lock has four fingers 36 integral therewith, composed of spring steel just as is the case with the conical spring segments. These four fingers act to center the nut on the bolt and, in addition, one of them drops into and engages a slot 38 in the side of the spindle bolt and thus locks the ratchet plate 32 to the spindle bolt against relative rotation, just as soon as the nut is rotated on the bolt by as little as ¼ of a turn. When this happens, the ratchet plate 32 in effect becomes locked to the spindle 20. However, the nut itself can still be rotated (tightened/or loosened depending on the direction of rotation,) by the ratcheting action shown in FIGS. 6 and 7 as explained above, simply by turning cage 22 with a socket wrench which in turn rotates the conical spring segments 40,42,44 and 46 in somewhat the same manner (until they are seated) as a solid nut is run down on a bolt.

The nut can thus be tightened, to the position in which it exerts the selected preload force on bearings 12,14 and then will be automatically locked by one of the lugs 36 being engaged in slot 38 in the side of the bolt. No backward rotation is necessary to form that lock, at exactly the desired pre-load Ratchet 32 and lugs 34 thereon enable the nut to be tightened to exactly the desired pre-load and then hold the nut in that position.

In the ratcheting operation, during run down of the nut 18, there must of course be some provision made to allow lugs 34 to disengage from the slots 26 in cage 22. This is provided by forming slots in the sidewall of cage 22 at each corner of the hexagonal cage. Such slots allow each side wall to flex between the slots, and about the lower corner as a hinge, thus allowing the cage to free itself from lugs 34 as the cage is rotated clockwise relative to the spindle bolt and ratchet lock 32.

Thus there is formed a new automatic and positive lock which requires only tightening of the nut with the usual wrench. Once in place and locked in the desired position, it simply won't come loose, regardless of vibrations, and fully meets presently known product liability requirements.

The use of this lock is of course not limited to laminated nuts. It may also be used with solid nuts. It has particular utility however for lock nuts for spindles for front drive automobiles where a high degree of precision and at the same time positive safety is required.

As previously stated, all parts of the lock nut of this invention can be made of spring steel or other spring material and the ratcheting action in the embodiment shown is provided by flexing of the side walls of the nut. However, the flexing need only be very slight and it is found in practice that the usual socket wrench tolerances are sufficient to allow the socket head to fit over the nut, and to rotate the nut, with ratcheting action and consequent side wall flexing without bending. In fact, the flexing wall action tends to hold the socket on the nut until it is tightened to the point where the ratchet locks in final position and the socket is to be removed.

In the embodiment shown, twelve lugs 34, and 6 slots 26 are provided.

The load bearing components of nut 18, as shown in FIGS. 2 through 7, consist of four conical washer spring segments 40,42,44 and 46 which are stacked and aligned to form in effect a laminated nut.

It should be noted that the combination shown of the ratchet with self seeking fingers provides an entirely new result, of substantial commercial advantage. The job not only can be done better, but also cheaper.

The angle used for each cone shaped spring segment can be calculated by a formula disclosed in Schnoor's Disc Spring Handbook, pages 12–17. As previously stated, the spring discs are not calculated completely to flatten under the designed load; they flex, both up and down as the bolt elongates, contracts, or vibrates.

FIG. 9 compares the results obtained from a solid nut shown at the left of the Figure and so marked, with the results obtained from a spring disc laminated nut with cone spring segments. As will be seen, the bearing preloads are maintained over wide ranges of deflection for the conical spring disc laminated nuts (the two right hand curves) as compared with the 9 solid nut in the left hand curves.

The formulas relating to loads necessary to flatten cone-spring discs show that, other things being held constant, the load to flatten will increase with disc thickness. This principle is utilized in FIG. 8 to provide a nut of greater load carrying ability because of more uniform thread loading, or increased fatigue life, and of greater self blocking characteristics.

In FIG. 8 the bottom cone shaped spring washer segment 72 is of about twice the thickness of the two other segments 68 and 70. This results in a more even distribution of the load, from bolt to nut, over the length of the threaded sections 68,70, and 72. Thus the nut is less likely to fail by shear of the bolt, stripping of the threads, or by fatigue failures. A substantial improvement results with no additional cost, simply by novel design.

Three laminated segments are shown in FIG. 8 but less or more for example 2 or 4 could be used. The automatic lock of FIGS. 1 through 7 also could be added to FIG. 8 if desired.

FIGS. 10, 11 and 12 show a tool, or fixture for disengagement of the nut lock for removal of the nut. Pin 82 fits in the centering recess of spindle bolt 20 and an arm 84 extends therefrom over the edge of the bolt and under lug 36. Thus lug 36 is lifted out of slot 38, allowing it to be turned, and removed, by a socket wrench which fits over outer cage 22.

Some modifications of this invention will of course be obvious to those skilled in the art. In the embodiment shown in the drawings the components, including the conical spring segments, are made of heat treated spring steel as a preferred material. However, it is possible as a modification of the preferred embodiment to provide a prevailing torque characteristic (interference after counter rotation), by incorporating a non heat treatable washer segment in the nut that is permanently flattened by the nut loading. This feature is significant to bearing applications that require bearing clearance adjustment.

Previous designs of the Elephant type nut, prior to the present inventor, used conical spring segments but did not relate the ununiform nut loading of the segments to functional deflection characteristics. The possible concentration of loading, in a nut-bolt thread fastening, nearly two thirds of all tension loading occurs at the first thread engaged. This uneven loading of previous multiple element nuts caused accelerated deflection of the first element. The results of this accelerated deflected element caused high stress on the male threads of the bolt with possible thread shear results. Nuts previously made in this manner and commercially marketed would not meet SAE or IFI industry requirements for strength. It is an industry accepted practice that nut strength shear requirements must exceed bolt tensile strength so that the mode of failure is bolt breakage.

The present invention combines the industry established formula used for predicting conical washer behaviour, (Ref., page 13, Adolf-Schnoor "Disc Spring Handbook") with industry proven load distribution characteristics in nut-bolt joint applications. This combination used in association with other nut bolt tolerance standards allows for design of spring washer segments with predictable behaviour related to bolt loading. The nut design as proposed is based upon near uniform washer segment deflection and loading bottom to top.

With respect to the mechanically positive automatic lock mechanism of the invention, the lock mechanism automatically engages in a slot or groove or grooves in the associated bolt, stud or shaft, which can be driven by hand or power tools to desired torque or clamp load requirements, and is positively locked from counter rotation. The combination of an automatic-self seeking secondary lock mechanism and nut with predictable load-deflection characteristics that contributes spring loading, allows fastener loading of precise joint preload with the torque and clamp load tolerances of industry used power tools. This combination is particularly adaptable to loading bearings that require defined preload. Further, the design of this invention does not require any secondary adjustment for precise loading.

Further advantages of the present invention are (1) the establishment of design criteria that will produce uniform deflection of the nut related to nut-bolt joint loading that will provide predictable load-deflection and resultant interference for blocking. This combination will provide nut strength relationships commensurate with established industry standards. The uniform loading of the nut top to bottom is accomplished by varying the washer segment thickness related to loading. The bottom washer with the greatest load would be the heavy member with subsequent washers reduced in thickness. This means that washer segment thickness can be thickness that is greater than the pitch, more than a single pitch or less than a pitch.; (2) the provision of a parallel load surface for critical loading of joints that contain bearings. Heretofore, the nut required grinding or special surface finishes related to perpendicularity of the axis of the thread to provide uniform interface loading. The resilient action of this invention allows the interface surface to self seek for uniform loading.; and (3) the provision of an inexpensive tool for the purpose of easily defeating the locking devise to facilitate removal and reuse.

OPERATING EXAMPLE

To illustrate the application of the invention to a particular use, the following is an example of the automatic nut lock as manufactured for use as the spindle lock nut of a 1981 Escort and Lynx Ford front wheel drive car:

Ford engineering specified load ME-900.10=46,500 lbs Proof Load

Application—Front wheel spindle nut design load=- 17–22,000 lbs.

Assembly Torque 180–220 lb.ft.

Nut to have six threads with design dimensional stack tolerance to accommodate five threads minimum.

Nut Construction:

Conical spring washer elements, 0.078" thick with crown of 0.050", material 1065–1070 spring steel, ratchet locking mechanism and cage—also spring steel. Cage is 0.036", Lock Mechanism is 0.040 thick.

Application Description:

Spindle nut to be hand started, driven by Rockwell Tool at 125 RPM. Locking Mechanism to self seek locking slot and ratchet free to design clamp load.

The sample spindle nut described above does not incorporate varied thickness conical spring washer element. This application is utilizing less than 50% of the nut proof load capacity and is not susceptible to high shear loading.

What is claimed is:

1. A laminated nut provided with an automatic locking means comprising, a plurality of stacked conical spring washers which are tapped to match the threads of the bolt on which said nut is to be threaded, a cage for holding said spring washers in stacked, aligned, relation so that act in effect as if they were a single threaded unit, and a locking washer within said cage having at least one upstanding lug for engaging with at least one slot in the side of said bolt and having a ratcheting connection with said cage so that the cage can rotate relative to the locking washer in one direction of rotation but is locked against such rotation in the other direction of rotation.

2. A cage for an automatically locking nut comprising a hexagonal spring steel enclosure having a bottom flange shaped to provide a load face and a top flange shaped to retain in said cage a locking plate having at least one projection extending radially outwardly therefrom for engaging at least one of a series of circumferentially spaced slots in the side wall of said cage, and a plurality of spring steel fingers extending upwardly from said plate and beyond said top flange, said fingers being circumferentially spaced around the axis of said cage and being of such width and diametrical spacing as to engage in slots formed in the side of the bolt on which said nut is to be assembled, and thus lock the said plate against rotation with respect to said bolt.

3. A cage according to claim 2, in which at least a portion of the side wall of said cage is flexible so that said projection can be disengaged from said slot in the side wall of the cage by rotation of the cage relative to the locking plate.

4. A laminated nut comprising a plurality of hexagonal internally threaded laminated segments contained within a hexagonal cage and rotatable therewith when threaded on a bolt having matching threads, said cage having upper and lower turned in flanges for retaining said segments within said cage in stacked alignment, a locking means within said cage between said upper and lower flanges having a ratcheting connection with the side wall of said cage for allowing rotation of said cage and segments in one direction of rotation relative to said bolt but preventing rotation of said cage and segments in the other direction relative to said bolt.

5. A laminated nut comprising a plurality of hexagonal internally threaded laminated segments contained within a hexagonal cage and rotatable therewith when threaded on a bolt having matching threads, a cage having upper and lower turned in flanges for retaining said segments within said cage in stacked alignment, the side walls of said hexagonal cage having slots therein which allow the side walls between the slots to flex about the lower corners formed by the junction of the side walls with the lower flange, and a locking plate within said cage having a series of circumferential lugs engagable with a series of circumferential slots in said side walls, so that said plate can ratchet with respect to said cage.

6. A laminated nut composed of laminated conical spring segments characterized by substantially uniform thread loading of bolt thread to nut thread having a first lamination of a predetermined thickness for producing a preselected load/deflection ratio, and having a second lamination of a predetermined thickness which is greater than the thickness of said first lamination by a preselected amount sufficient to cause the load, from bolt to nut, to be more evenly distributed over the length of both said first and said second laminations.

7. A spindle lock nut having a plurality of internally threaded spring washer segments retained by a cage, and means in said cage for locking said cage and said segments against rotation with respect to a spindle on which said nut is assembled in a nut loosening direction comprising, a locking plate which has projections spaced circumferentially around its rim which engage slots in the side wall of said cage to provide a ratcheting connection with said cage and segments, and at least one lug extending from said locking plate upwardly above said cage for engaging a slot in the side of said spindle to lock said plate, and thereby said cage and segments, against rotation with respect to said spindle.

8. In a laminated free-spinning nut having at least two washer segments, the improvement which comprises forming at least one of said segments of a material which takes a permanent set upon loading and forming at least one other of said segments of a spring material that returns substantially to its original form following release of the loading force, thus providing a nut characterized by a prevailing torque resisting counter-rotation.

9. A laminated nut composed of laminated internally threaded conical spring segments retained in stacked, aligned relationship by a surrounding cage so they act, in effect, as if they were a single threaded unit, said segments including a top segment having a predetermined deflection when subjected to a predetermined axial load and a bottom segment having a different predetermined deflection when subjected to the same axial load, the said deflection of said bottom section being smaller than the said deflection of said top section by a predetermined amount sufficient to more evenly distribute a load transmitted across said threads from a bolt to said nut along the entire length of said threads in both said top and said bottom segments.

* * * * *